United States Patent [19]

Daigle et al.

[11] Patent Number: 4,901,957
[45] Date of Patent: Feb. 20, 1990

[54] MODULAR CONDUIT SYSTEM

[75] Inventors: Robert V. Daigle, Deerfield Beach, Fla.; Gordon J. Grice, Janesville, Wis.

[73] Assignee: Creative Systems Engineering, Inc., Janesville, Wis.

[21] Appl. No.: 211,967

[22] Filed: Jun. 27, 1988

[51] Int. Cl.⁴ .............................................. F16L 3/00
[52] U.S. Cl. ..................................... 248/62; 248/65; 248/74.4
[58] Field of Search .................... 248/62, 58, 65, 74.4, 248/74.1, 343, 49, 63; 239/209; 138/107

[56] References Cited

U.S. PATENT DOCUMENTS

| | | | |
|---|---|---|---|
| 3,464,172 | 9/1969 | McGee, Jr. ...................... | 239/209 X |
| 3,539,137 | 11/1970 | March ................................. | 248/62 |
| 4,058,167 | 11/1977 | Granek et al. .................... | 239/450 X |
| 4,079,786 | 3/1978 | Moling ............................. | 239/209 X |
| 4,252,289 | 2/1981 | Herb .................................... | 248/62 |
| 4,330,040 | 5/1982 | Ence et al. ...................... | 239/209 X |
| 4,795,114 | 1/1989 | Usui et al. ........................... | 248/62 |

FOREIGN PATENT DOCUMENTS 0835605   5/1960   United Kingdom ............... 248/74.4

Primary Examiner—Ramon O. Ramirez
Attorney, Agent, or Firm—M. K. Silverman

[57] ABSTRACT

A modular pipe system is provided for ease of securement to a ceiling or wall. The pipe system includes a back plate which is secured to the constructional surface, the back plate provided with a nesting surface for receiving a pipe and with longitudinal first complemental coupling means. The pipe is snap-fittably secured into said nesting surface. About the pipe is provided a first plate having longitudinal second coupling means proportioned for snap-fit engagement with the first coupling means such that the first plate will, in radial cross-section area between the interior of the front plate and the interior of the back plate, externally to said pipe. The front plate will be formed fire-resistance rated material such as a mineral-filled Noryl.

10 Claims, 1 Drawing Sheet

MODULAR CONDUIT SYSTEM

BACKGROUND OF THE INVENTION

The present invention relates to a Modular Waterpipe system and, more particularly, to a water pipe system which will facilitate ease of securement of waterpiping to walls and ceilings and, as well, which will provide a method of insulation of such piping.

There exists in the prior art and, particularly, in the context of piping systems having a utility in connection with fire extinguishing, structures, which to some degree, may be considered modular. This prior art comprises U.S. Pat. No. 3,464,172 (1969) to McGee; No. 4,058,167 (1977) to Granek; No. 4,079,172 (1978) to Moling and No. 4,330,040 (1982) to Ence.

None of the above, or other, prior art known to the inventors, discloses a modular waterpipe system in which insulation may be included within the mechanical structure of the pipe system and in which the piping is supported to the wall and/or ceiling from both the rear and front thereof. Accordingly, prior art modular waterpipe systems do not enjoy either the structural integrity nor the insulative protection against fire first provided by the structure disclosed herein. Also, the components of systems shown in the prior art are not functional as a heat shield to the degree that the instant system is so functional.

The present invention consists completely of components which may be snap-fitted together in order form a fluid-tight fit between all components thereof, thereby alleviating need for much of the laborious aspect associated with the installation of piping as has been known in the prior art.

It is to be the above ends, and in response to the above described limitations in the prior art, that the present invention is directed.

SUMMARY OF THE INVENTION

The present invention constitutes a modular waterpipe and water pipe insulation system comprising a back bracket adapted for securement to a wall, ceiling, or to the line of intersection therebetween. Said back bracket also comprises, along the longitudinal edges thereof, first complemental engagement means. The system further includes a pipe proportioned for snap-fit nesting within the geometry above said back plate. Further provided as a part of the inventive modular waterpipe system is a front plate having, along the longitudinal edges thereof, second complemental coupling means proportioned for coupling to said first complemental coupling means of said back plate, whereby, when said front plate is coupled, along said first complemental coupling means, to said back plate, said nested pipe element is, in radial cross-section, completely enclosed within said cover such that, in the cross-sectional area between the interior of said front plate and the interior of said back plate, insulation may be provided. The front plate is, further, formed of a high fire resistant material.

In a second embodiment, the pipe may nest within a structure depending from the cross-sectional interior of the front plate.

In view of the above, it may be appreciated that an object of the present invention is to provide an improvement modular waterpipe system by which installation of pipe, and heat shields therefor, upon the walls, ceiling, or intersections thereof, of a building may be more readily facilitated.

It is another object to provide a modular pipe system of the above type in which insulation of the piping may be provided internally to the cross-sectional geometry of such a pipe system.

It is a further object of the present invention to provide a waterpipe system in which a protective heat shield may be pressfittably coupled over the pipe and about the insulation therefore.

The above and yet other objects and advantages of the present invention will become apparent from the herein set forth Detailed Description of the Invention, the Drawings and Claims appended herewith.

DETAILED DESCRIPTION OF THE INVENTION

Figure 1:
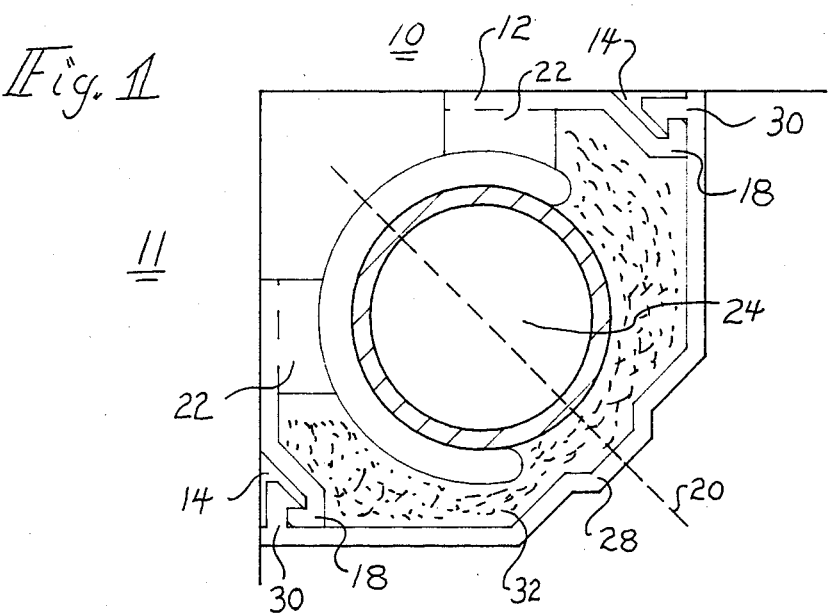
FIG. 1 is a radial cross-sectional view of a first embodiment of the inventive modular waterpipe system.

With reference to the cross-sectional view of FIG. 1, there is shown a first embodiment of the modular pipe system. Therein, there is shown positioned, at the region of intersection between a ceiling 10 and a wall 11, a back plate 12 the edges of such plate comprising longitudinal first complemental coupling means 14 which, in the embodiment of FIG. 1, take the form of a female snap-fit coupling, the walls of which are defined by longitudinal element lip 18. As may be noted, back plate 12, as well as further elements described below, are symmetric about the axis of line 20.

Figure 2:
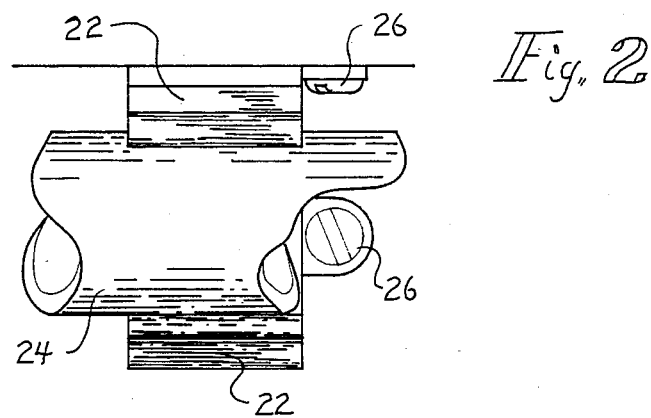
FIG. 2 is a longitudinal external view of the embodiment of FIG. 1.

As may be further noted, the interior of back plate 12 is provided with integral nesting element 22, the function of which are to receive a pipe 24 in snap-fit relationship therewith. Accordingly, the present system, in operation, involves, as a first step, the securement of back plate 12, to (in the illustrated method of use of FIG. 1) ceiling 10 and wall 11 as, for example, by either screw means 26 (as shown in FIG. 2) or, in a given application, by other securement means such as glue or adhesive means.

Thereafter, as a second step, pipe 24 is snape-fitted into nesting elements 22 of back plate 12.

Thereafter, front plate (also alternatively termed a heat shield) 28, having on the edges thereof longitudinal second complemental means coupling 30, is snap-fitted onto longitudinal lip element 18 of first complemental coupling means 14. Accordingly, as may be appreciated in the radial cross-sectional view of FIG. 1, the second complemental coupling means 30 of the front plate 28 is proportioned for snap-fit engagement with the first complemental coupling means 16 of back plate 12, such that the front plate may be readily attached to the back plate, thereby enclosing the pipe 24 without need for the use of costly bracketing gluing or the like.

A further advantage of the above described modular pipe system is that insulation 32 may be placed in the area indicated by the shading in FIG.. 1. Accordingly, the pipe 24 may be protected by materials such as shredded fiberglass insulating material 32 and, as well, by front plate 28 which, in many applications, will be formed of a high fire-resistant material such as a G.A. MINERAL-FILLED NORYL. Accordingly, there is achieved a pipe and pipe support system which is stable, and which may be readily serviced by the simple snap removal of front plate 28 from back plate 12 and, if necessary the snap removal of pipe 24 from nesting elements 22 of back plate 12.

The above described system is particularly useful where the installation of fire sprinklers of nozzles is contemplated in that such nozzles or sprinklers may be easily installed within a pipe system that may be readily assembled and disassembled in accordance with the principles of the embodiment described above.

Figure 3:
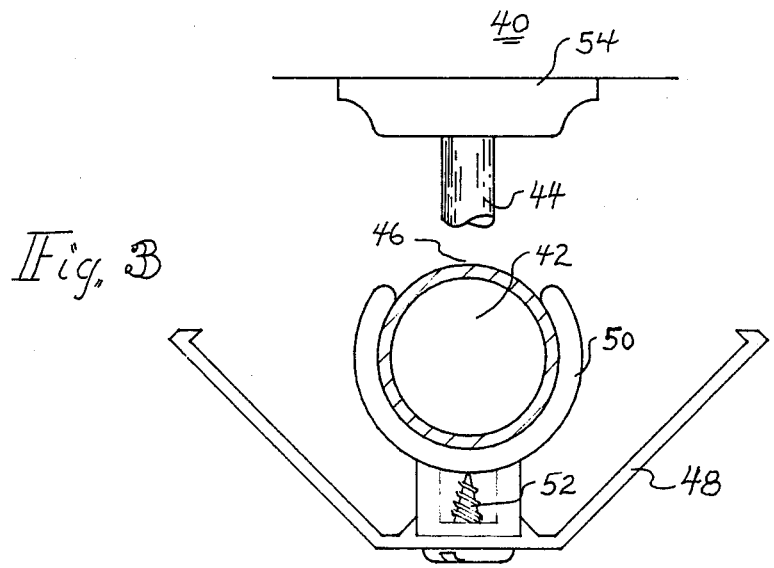
FIG. 3 is a radial cross-sectional view of a second embodiment of the modular pipe system.

With reference to FIG. 3, there is shown a second embodiment of the present invention in which there is suspended from a ceiling 40 a pipe 42. This is achieved through the use of pipe hanger 44 which depends from ceiling 40 and, thereby holds pipe 42 at point 46.

As a separate assembly, there is provided a front plate 48 and a nesting element 50. As may be noted in FIG. 3, nesting element 50 is secured to front plate 48 point 52. Further, nesting element 50 is proportioned for the snap-fit engaged of pipe 42.

In the embodiment of FIG. 3, it is to be appreciated that pipe hanger 44 may be considerably reduced in dimension where it is desired to position pipe 42 closer to ceiling 40. Also, in the manner shown in FIG. 3 of U.S. Pat. No. 4,079,786 to Moling, the embodiment of FIG. 3 may be positioned vertically at the intersection of two walls. Therein, the pipe hanger 44 would be adapted at an interface area 54 with the surface geometry of the intersection of the walls. In the embodiment of FIGS. insulation may, as is the case in the embodiments of FIGS. 1 and 2, be placed within cross-sectional geometry between bracket 50 and front plate 48, thereby providing protection to pipe 42. Similarly, a front plate 48 will, in a preferred embodiment, be made of a highly fire-resistant material. Also, as is the case in the embodiment of FIGS. 1 and 2, pipe 42 is supported both from the back and front thereby providing the modular system thereof with enhanced stability. And, as in the case of the first described embodiment, the embodiment of FIG. 3 provides ease of assembly and disassembly, both for purposes of installation and for future servicing of the pipe system.

Accordingly, while there has been herein shown and described the preferred embodiments of the present invention, it is to be appreciated that the invention may be embodied otherwise than is herein specifically shown and described that, with said embodiments, certain changes may be made within detail and construction thereof without departing from the underlying idea or principles of the present invention within the scope of the claims appended herewith.

Having thus described our invention what we claim as new, useful and non-obvious and, accordingly, secure by Letters Patent of the United States is:

1. A modular pipe system for securement to a constructional surface, comprising:
   (a) a back bracket having a back surface proportioned for securement to said constructional surface and having a front surface comprising resilient nestable rigidly securing means having a partially open face geometry in a direction opposite from said constructional surface, said back plate further comprising, along the edges thereof, longitudinal first complemental coupling means;
   (b) a pipe portioned for complemental coupling to said nesting means of said back plate; and
   (c) a front plate proportioned cross-section to said back plate and having, along the edges thereof, longitudinal second complemental coupling means proportioned for mating complemental engagement with said first complemental coupling means, whereby a modular pipe system may be formed by coupling said pipe to said nesting means and by mutually engaging said first and second complemental coupling means of said respective back and front plates.

2. The modular pipe system as recited in claim 1, further comprising insulation means disposed externally of said pipe and intermediately within the internal surfaces defined by said back and front plates after the mutual coupling engagement thereof.

3. The pipe system as recited in claim 1 in which:
   said complemental coupling of said pipe to said coupling means comprises a snap fit coupling; and
   said mating engagement between said front plate and said back plate comprises a snap-fit engagement.

4. A modular pipe system for securement to a constructional surface comprising:
   (a) a pipe hanger depending from said constructional surface;
   (b) a pipe secured to said pipe hanger at an end thereof opposite to the end secured to said constructional surface; and
   (c) a covering plate having, integrally formed therein, a nestable rigidly securing element proportioned for complemental engagement of said pipe about at least one cross-sectional semicircle thereof.

5. The pipe system as recited in claim 4, further comprising insulating means disposed intermediately between the interior surface of said cover plate, facing said constructional surface, and the exterior of said pipe.

6. The pipe system as recited in claim 4 in which said constructional surface comprises a ceiling.

7. The pipe system as recited in claim 4 in which said constructional surface comprises a wall.

8. The pipe system as recited in claim 7 in which said wall comprises the intersection of two walls.

9. The pipe system as recited in claim 4 in which: said complemental engagement between said nesting element and said pipe comprises a snap-fit engagement.

10. A modular pipe system for securement to a constructional surface, comprising:
   (a) a back bracket having a back surface proportioned for securement to said constructional surface and having a front surface, said back plate further comprising along the edges thereof longitudinal first complemental coupling means;
   (b) a pipe proportioned for snap-fit coupling to said nesting means of said back plate; and
   (c) a front plate proportioned in cross-section to said back plate and having, along the edges thereof, longitudinal second complemental coupling means proportioned for mating snap-fit engagement with said first complemental coupling means, said front plate further comprising an integral resilient nesting means having a semi-circular open face geometry in a direction opposite from said constructional surface,
   whereby a modular pipe system may be formed by coupling said pipe to said nesting means and by mutually engaging said first and second complemental coupling means of said respective back and front plates.

* * * * *